United States Patent [19]
Fuckert et al.

[11] Patent Number: 4,779,757
[45] Date of Patent: Oct. 25, 1988

[54] CONTAINER WITH INTERNAL LINING

[75] Inventors: Karl O. Fuckert, Essen, Fed. Rep. of Germany; Karel Svoboda, Summit, N.J.

[73] Assignee: Krupp-Koppers GmbH, Essen, Fed. Rep. of Germany

[21] Appl. No.: 88,420

[22] Filed: Aug. 6, 1987

[30] Foreign Application Priority Data

Sep. 5, 1986 [DE] Fed. Rep. of Germany ....... 3630274

[51] Int. Cl.⁴ .............................................. B65D 90/04
[52] U.S. Cl. .................................... 220/456; 220/457
[58] Field of Search ............... 220/456, 454, 457, 470, 220/461

[56] References Cited

U.S. PATENT DOCUMENTS

| | | | |
|---|---|---|---|
| 3,951,190 | 4/1976 | Suter | 220/456 |
| 3,969,563 | 7/1976 | Hollis, Sr. | 220/456 |
| 4,055,272 | 10/1977 | Beese | 220/456 |
| 4,345,698 | 8/1982 | Villemain | 220/456 |
| 4,452,375 | 6/1984 | Marcus | 220/456 |

*Primary Examiner*—Joseph Man-Fu Moy
*Attorney, Agent, or Firm*—Michael J. Striker

[57] ABSTRACT

A container for chemically aggressive liquids and gases has an internal lining which has a coating of meshed wire or expanded metal welded to at least a portion of the inner face of the container and a layer of synthetic resin putty applied to said coating.

4 Claims, 1 Drawing Sheet

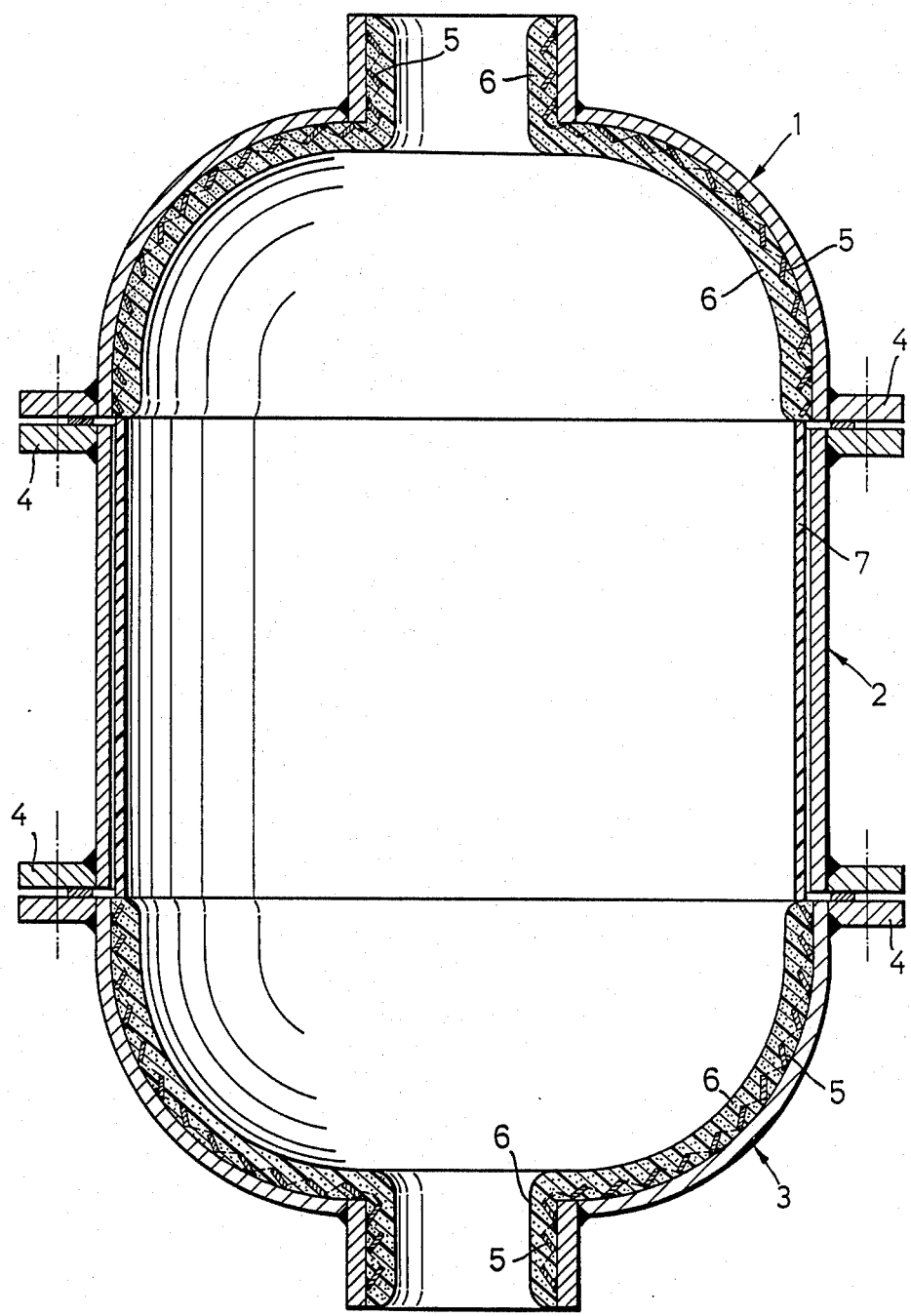

CONTAINER WITH INTERNAL LINING

BACKGROUND OF THE INVENTION

The present invention relates to a container made of light metal and provided with an internal lining.

Containers of light metals such as aluminum and/or magnesium as well as their alloys are for corrosion reasons, utilized for storing gaseous or liquid media distinguished by certain chemical agressiveness. The upper surface of the metal being utilized is provided with a so-called passivation layer by which the metallic material must be protected against a chemical influence of the medium contained in the container.

Containers of the type under discussion have been employed as filling elements, gas distributing elements or the like, these elements can originate vortexes in the gaseous phase, which vortexes together with entrained liquid particles, lead to a considerable removal of the passivation layer because the metals used for such containers have little hardness. Furthermore, this metal is unprotected against chemical attacks of the fluid contained in the container. To prevent this negative effect the containers must be provided with a sufficient internal protection.

It has been customary up to now to provide containers of the foregoing type with a lining of acid-resistant stones applied to the internal surface of the container. Such design of the protection of the internal side has, however, some disadvantages. On the one hand, the application of such a lining for the geometrically complicated parts of the containers, particularly convex parts and tubular flanges, is difficult and requires a number of special stone molds. On the other hand, due to the provision of the lining of stone, the inner diameter of the container is considerable reduced which automatically leada to the reduction of the throughput of the container.

SUMMARY OF THE INVENTION

It is an object of the present invention to provide an improved container for gaseous and liquid media.

It is a further object of the present invention to provide a container with the inner lining, in which the aforementioned drawbacks would be eliminated.

Yet another object of the invention is to provide a container which is easy and non-expensive to make.

These and other objects of the invention are attained by a container for gaseous and liquid media made of light metal, comprising a wall defining an interior of the container and having an internal surface; and an internal lining provided on said internal surface, said lining including a first layer of at least expanded metal and a meshed wire covering at least partially said internal surface, and a second layer of synthetic resin putty applied to said first layer whereby the internal surface of the container is protected against chemically aggressive gases or liquids which are to be contained in the container.

Due to the invention the internal lining formed of the coating or layer of expanded metal or meshed wire as well as the layer of synthetic resin putty can be applied onto the entire internal surface of the container or only onto the part thereof. For example, it is sufficient in many cases that only the area which is subject to extensive corrosion be provided with such lining.

The container wall at said internal surface may have a portion which is not covered with said first layer and said second layer said portion being protected by a plastic layer applied thereonto.

The plastic layer may be applied to cover a geometrically simple area of said internal surface, for example the cylindrical portion.

The internal lining of the container of the invention has a substantially small thickness. Normally the thickness of the lining of the invention is in the range between about 2 cm and 3 cm. Thus the reduction in the inner diameter of the container is so insignificant that it does not affect its weight or its throughout.

Said expanded metal may be aluminum.

The second layer may be of acid-resistant putty on the basis of phenol resin.

Said plastic layer may be made of polyethylene or polyprophylene.

Fine capillary fissures occur in the layer of synthetic resin putty, which is absolutely harmless because the protection against corrosion is carried out by the passivation layer of light metal and the layer of expanded metal is welded to the container wall by spot welding. Thereby it is provided that the container of light metal can be employed, yet the protection against corrosion which was impossible or difficult for manufacturing reasons until now, is completely ensured.

Typical applications for containers are acid neutralizers and decanters of coke oven plants and container for sulfur acid installations and other plants at which chemically agressive media are employed, for example, thick water plants in the coke oven industry.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE of the drawing shows a partial axial sectional view of the container according to the invention.

DETAILED DESCRIPTION OF THE PREFERRED EMBODIMENTS

Referring now to the drawing in detail, it will be seen that reference numeral 1 designates an upper portion of the container, reference numeral 2 denotes a middle portion and a lower portion is designated at 3. All the above portions are connected to each other by flanges 4. The upper portion 1 and the lower portion 3 are lined at the internal surfaces thereof with an expanded metal coating 5, for example of aluminum. A synthetic resin putty or mastic 6 is applied to the lining or coating 5. Layer 6 may be acid-resistant resin mastic on the basis of phenol resin. The layer of the expanded metal 5 is thereby connected to the inner side of the container wall by spot welding and also provided a necessary holding for the layer of synthetic resin putty 6. Layer 6 can be applied to the surface of layer 5 either by brushing or knifing or by spraying of the mastic onto the layer of expanded metal 5.

The middle portion 2 of the container shown in the drawing is cylindrical while portions 1 and 3 are formed by portions of circles. Middle portion 2 has an internal layer 7 which is a plastic protective layer. Protective layer 7 precisely corresponds in its dimension and shape to the middle portion 2 and is loosely applied into the interior of the container. Plastic protective layer 7 may be made of polyethylene or polyprophylene.

The internal parts and components of the container are omitted because they do not form the invention.

It will be understood that each of the elements described above, or two or more together, may also find a useful application in other types of containers for chemically aggressive fluids differing from the types described above.

While the invention has been illustrated and described as embodied in a container for fluids, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Container for gaseous and liquid media, comprising a wall formed of light metal and defining an interior of the container, said wall including a middle portion, an upper portion and a lower portion and being formed as a single wall having an internal surface; and an internal lining provided on said internal surface, said lining being applied to the internal surface only of said upper portion and said lower portion so as to be in direct contact with said internal surface, said lining including a first layer of at least expanded metal and a meshed wire, and a second layer of synthetic resin putty applied to said first layer and enclosing the same, the internal surface of said middle portion being covered with a protective plastic layer, whereby the wall of the container is protected against chemical attacks of the media contained in the container.

2. Container as defined in claim 1, wherein said expanded metal is aluminum.

3. Container as defined in claim 1, wherein said second layer is of acid-resistant putty on the basis of phenol resin.

4. Container as defined in claim 1, wherein said plastic layer is made of polyethylene or polyprophylene.

* * * * *